(12) United States Patent
Burbank

(10) Patent No.: US 12,284,940 B2
(45) Date of Patent: Apr. 29, 2025

(54) HARVESTED MATERIAL RECEPTACLE FOR A HARVESTER HAVING FOLDABLE EXTENSION ELEMENTS

(71) Applicant: CLAAS Selbstfahrende Erntemaschinen GmbH, Harsewinkel (DE)

(72) Inventor: Martin Burbank, Warendorf (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 876 days.

(21) Appl. No.: 17/381,687

(22) Filed: Jul. 21, 2021

(65) Prior Publication Data

US 2022/0046855 A1 Feb. 17, 2022

(30) Foreign Application Priority Data

Aug. 14, 2020 (DE) .......................... 102020121473.1

(51) Int. Cl.
  *A01D 41/12* (2006.01)
  *A01F 12/60* (2006.01)

(52) U.S. Cl.
  CPC .......... *A01D 41/1226* (2013.01); *A01F 12/60* (2013.01)

(58) Field of Classification Search
  CPC .............................. A01D 41/1226; A01F 12/60
  See application file for complete search history.

(56) References Cited

U.S. PATENT DOCUMENTS

| 2003/0078085 | A1 | 4/2003 | Gerber et al. | |
| 2003/0232634 | A1* | 12/2003 | Johnson | A01D 41/1226 460/119 |
| 2009/0215509 | A1 | 8/2009 | Johnson et al. | |
| 2011/0095554 | A1* | 4/2011 | Zeuner | A01D 41/1226 296/15 |
| 2013/0196725 | A1* | 8/2013 | Bossuyt | F16B 5/008 460/119 |
| 2013/0296005 | A1* | 11/2013 | Claes | A01D 41/1226 460/119 |

(Continued)

FOREIGN PATENT DOCUMENTS

| DE | 10051096 A1 | 4/2002 |
| DE | 10051096 B4 | 11/2006 |
| EP | 2661951 A2 | 11/2013 |

OTHER PUBLICATIONS

European Search Report for European Application No. 21182816.5-1004 dated Dec. 8, 2021.

*Primary Examiner* — Thomas B Will
*Assistant Examiner* — Julia C Tran
(74) *Attorney, Agent, or Firm* — Lempia Summerfield Katz LLC

(57) ABSTRACT

A harvested material receptacle for a harvester. The harvested material receptacle includes a hopper that is open at the top with a substantially polygonal opening cross-section and extension elements arranged in pairs opposite each other. The extension elements are each pivotably articulated about a substantially horizontally running pivot shaft at the edge of an opening of the hopper to transition the extension elements from a substantially closed transport position into an open receiving position and vice versa, wherein the extension elements that are opposite one another lie sandwich-like on each other when in their transport position.

19 Claims, 6 Drawing Sheets

(56) References Cited

U.S. PATENT DOCUMENTS

| | | | |
|---|---|---|---|
| 2015/0272000 A1* | 10/2015 | Claes .................. | A01F 12/60 |
| | | | 56/473.5 |
| 2016/0360696 A1* | 12/2016 | Vandevelde ............ | E05F 15/53 |
| 2017/0238462 A1* | 8/2017 | Cavkusic ........... | A01D 41/1226 |

* cited by examiner

HARVESTED MATERIAL RECEPTACLE FOR A HARVESTER HAVING FOLDABLE EXTENSION ELEMENTS

CROSS REFERENCE TO RELATED APPLICATION

This application claims priority under 35 U.S.C. § 119 to German Patent Application No. DE 102020121473.1 filed Aug. 14, 2020, the entire disclosure of which is hereby incorporated by reference herein.

TECHNICAL FIELD

The present invention relates to a harvested material receptacle for a harvester.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Harvested material receptacles for harvesters may include a hopper that is open at the top. The hopper may have a substantially polygonal opening cross-section. To close the hopper and expand the volume of the hopper, extension elements arranged or positioned in pairs and opposite each other may be provided that are each pivotably articulated about a horizontally running pivot shaft at the edge of an opening of the hopper. The extension elements may be transitioned from a substantially closed transport position into an open receiving position and vice versa. While driving on the road, the extension elements can be space-saving in their folded transport position in which the extension elements close the hopper. In this way, a reliable overall height of the harvester can be maintained in road traffic. While operating the harvester on a field, the extension elements can be changed to their open receiving position in order to increase the volume of the hopper.

A harvested material receptacle for a harvester of the aforementioned type is disclosed in DE 100 51 096 B4. To increase the capacity of the hopper, DE 100 51 096 B4 discloses equipping an extension device with four walls that form a closed rectangle. Two opposing walls are made of an intrinsically rigid material that is provided with reinforcing ribs. The remaining walls are produced from an intrinsically flexible material. The walls consisting of an intrinsically rigid material are pivotable between a transport position in which they are swung towards each other and downward, and a raised receiving position open at the top. The walls consisting of an intrinsically flexible material are connected at the end to the walls consisting of rigid material and connect the latter to each other so that a closed ring arises when the device is in the receiving position. The walls consisting of flexible material are erected into the operating position by the walls consisting of rigid material and, due to their flexibility, fold together when the walls consisting of rigid material are folded into the nonoperating position.

DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
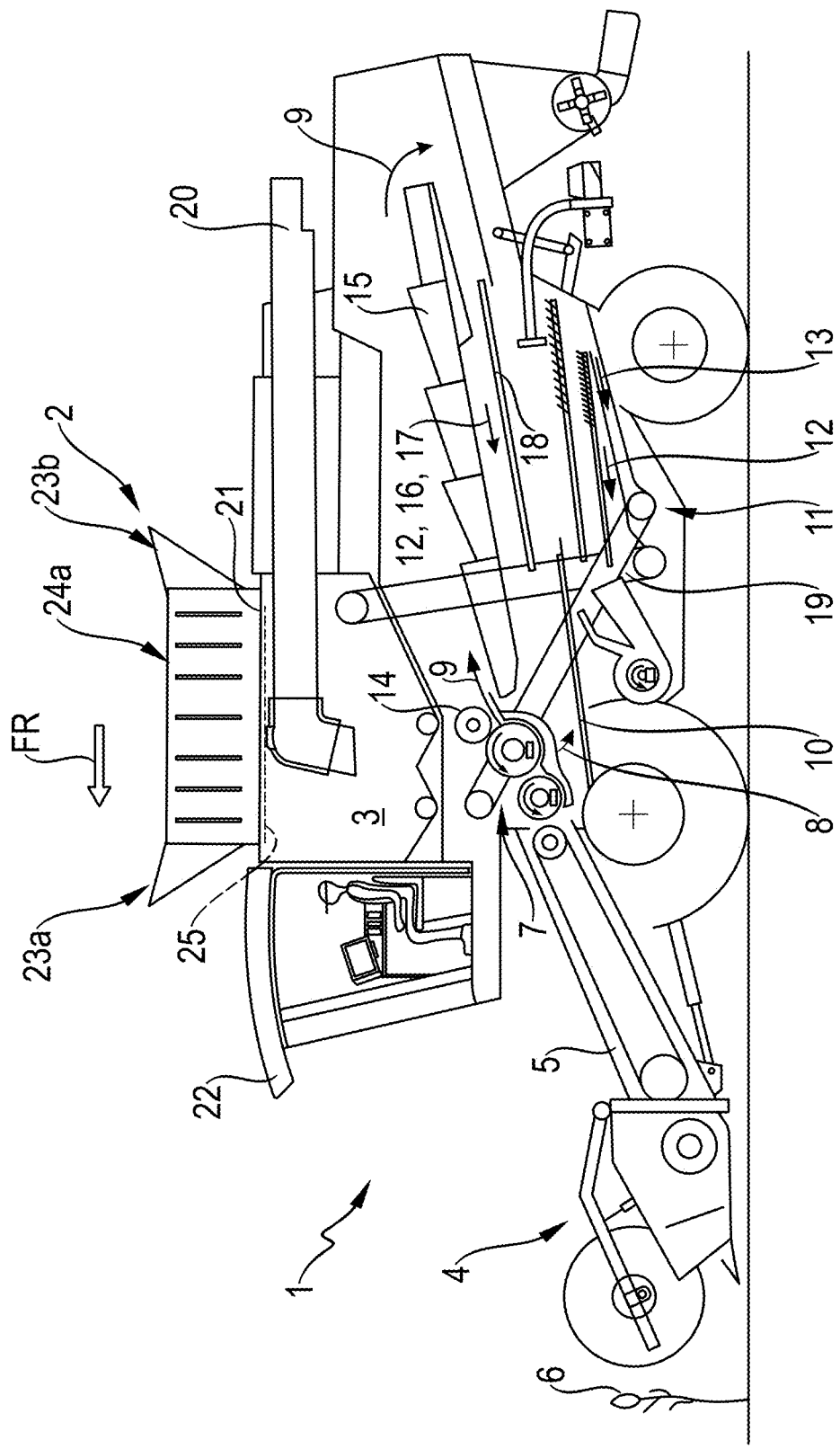
FIG. 1 illustrates a schematic representation of a side view of a harvester with a harvested material receptacle.

In contrast to the disclosed art, the disclosed harvested material receptacle for a harvester includes a greater volume and a simplified design of the extension elements.

In one or some embodiments, the above may be achieved with a harvested material receptacle for a harvester in which extension elements of the harvested material receptacle at least partly overlap one another. In particular, a harvested material receptacle for a harvester is disclosed that includes a hopper, which is open at the top with a substantially polygonal opening cross-section and a plurality of extension elements (e.g., the extension elements arranged or positioned in pairs opposite each other). The extension elements may each be pivotably articulated to the hopper about a pivot shaft that runs substantially horizontally in order to transition the extension elements from a substantially (or entirely) closed transport position into an open receiving position and vice versa. According to one or some embodiments, the extension elements that are opposite one another may partly overlap one another (e.g., lie sandwich-like on each other when in their transport position). In this regard, the extension elements that are opposite one another may at least partially overlap (e.g., substantially or entirely overlap) each other when in their transport position. The extension elements that are opposite one another extend, viewed in the tilting direction, beyond one-half the length or width of the opening cross-section. This allows a greater volume to be available in the open receiving position.

In particular, the extension elements that are opposite one another may at least partly overlap each other in their transport position, wherein for its part, a top pair of extension elements overlaps a bottom pair of extension elements. Accordingly, in one or some embodiments, the sandwich-like superposition of the extension elements is achieved on the one hand in that opposing extension elements sectionally overlap in the transport position, and moreover the extension elements of the bottom pair are overlapped by the extension elements of the top pair. The respective bottom and top pair are formed by the opposing extension elements.

For example, the extension elements may comprise a top pair of extension elements and a bottom pair of extension elements. In the closed transport position, one of the top pair of extension elements at least partially overlaps another of the top pair of extension elements, and one of the bottom pair of extension elements at least partially overlaps another of the bottom pair of extension elements the bottom pair of extension elements. Thus, the top pair of extension elements and the bottom pair of extension elements may lie sandwich-like on each other such that the one of the top pair of extension elements substantially overlaps the another of the top pair of extension elements and such that the one of the bottom pair of extension elements substantially overlaps the another of the bottom pair of extension elements.

In this regard, the extension elements that lie on each other sandwich-like when in their transport position may be positioned on each other in horizontal planes. The extension elements of the bottom pair have a substantially trapezoidal outline. The extension elements of the top pair may have a substantially cuboid outline. Viewed in the longitudinal direction of the harvested material receptacle, the extension elements of the bottom pair are arranged or positioned on the end faces of the hopper, whereas the extension elements of the top pair are arranged or positioned on the longitudinal sides of the hopper.

In particular, the extension elements may be designed as a single piece (e.g., a single unitary piece). The strength of the extension elements may be easily realized due to the single-piece design of the extension elements. Other advantages of the single-piece design of the extension elements are the resulting reduced cost and the simplification and acceleration of assembly.

In one or some embodiments, the extension elements of the top pair may have complementary sections in their overlapping region that mesh, mate or complement in their transport position so that the extension elements of the top pair form a substantially continuous flat plane. The extension elements of the top plane may extend substantially parallel to the opening plane of the hopper.

When in their transport position, the extension elements of the bottom pair may have an inclination relative to the opening plane of the hopper in comparison to the top pair of extension elements. In particular, the extension elements of the bottom pair may be angled inwards (e.g., outside edges of the extension elements of the bottom pair running parallel to the pivot shaft are located below the opening plane and face the interior of the hopper).

In one or some embodiments, an intermediate element may always be arranged or positioned between two adjacent extension elements. The intermediate elements may be designed substantially triangular. The intermediate elements may connect the extension elements with each other so that, in the receiving position, a substantially annular extension of the hopper is formed. The extension elements may transfer to the intermediate elements the tilting movement that is performed when transferring from the receiving position to the transport position, or vice versa.

In one or some embodiments, the intermediate elements comprise (or consist of) an elastic material. In one or some embodiments, the intermediate elements may comprise (or consist of) a fabric-like material that has a high tearing resistance.

In particular, at edge regions extending in a vertical direction in the receiving position, the extension elements of the top pair may have a bevel that extends toward the opposing extension element. The bevels on the edge regions of the extension elements of the top pair may abut the extension elements of the bottom pair in transport position. This may keep the extension elements of the top pair at a distance from the extension elements located underneath so that they do not lie flush on each other. At the same time, this may form gaps that the intermediate elements at least partially fill when in the transport position.

Moreover, to transfer the extension elements between the transport position and receiving position, the harvested material receptacle may comprise an actuating device that has a common actuator which is configured for the controlled movement of the extension elements by a plurality of mechanical coupling links. The actuating device may form a kinematic chain with the extension elements.

In one or some embodiments, at least one of the extension elements of the bottom pair may be drivingly connected to the actuator by at least one characteristic-controlled coupling link such that a sequential movement of the two extension elements of the bottom pair is effectuated. In one or some embodiments, "sequential movement" means a movement of the extension elements of the bottom pair coordinated over time and space through which a collision during the transition between the transport position and the receiving position or vice versa is prevented.

In this case, the at least one coupling link may be designed as a spring, such as a gas tension spring.

Moreover, the extension elements of the top pair may be connected to each other by a coupling linkage designed as a multipart linkage, through which a sequential movement of the two extension elements of the top pair is effectuated. In one or some embodiments, "sequential movement" means a movement of the extension elements of the top pair coordinated over time and space, by means of which a collision during the transition between the transport position and the receiving position or vice versa is prevented.

In this case, the multipart linkage may have a coupling rod and a coupling element that are movable relative to each other in the longitudinal direction of the coupling rod, wherein the coupling rod and the coupling element are connected to each other by at least one characteristic-controlled coupling link. In particular, the at least one characteristic-controlled coupling link may be elastically deformable. In this case, the at least one characteristic-controlled coupling link may be designed as a damper, such as a hydraulic damper.

Moreover, a harvester, such as a self-propelled harvester with a harvested material receptacle is disclosed with the functions and structure described herein.

Referring to the figures, FIG. 1 schematically illustrates a side view of a harvester 1 that is designed as a combine. The harvester 1 has a harvested material receptacle 2 that comprises a hopper 3 (which may comprise a receiving container) with a substantially polygonal opening cross-section as well as extension elements 23a, 23b, 24a, 24b that are arranged or positioned in pairs opposite each other and are each pivotably articulated about a horizontally running pivot shaft 25 suggested as an example to the edge of an opening 21 of the hopper 3. The extension elements 23a, 23b, 24a, 24b are set up like a funnel to increase the volume of the hopper 3 (e.g., illustrated in FIG. 1 in their receiving position). Thus, extension elements may be in opposing pairs (such as 23a and 23b; 24a and 24b). Other layouts of extension elements are contemplated.

The harvester 1 is equipped at the front with an attachment 4 designed as a cutting unit that is arranged or positioned on an inclined conveyor 5. The harvester 1 collects the harvested material 6 using the attachment 4 and supplies the harvested material 6 to the inclined conveyor 5. The inclined conveyor 5 transfers the harvested material 6 to a downstream threshing system 7. The threshing system 7 processes the harvested material 6, wherein it is divided into a grain/chaff mixture 8 and a material flow 9 consisting of threshed stalks. The grain/chaff mixture 8 is conveyed over a grain pan 10 directly to a cleaning apparatus 11 that separates the grains 12 from the non-grain components 13, (e.g., from stalk and chaff parts).

Arranged or positioned behind the threshing system 7 is a turning drum 14 that rotates counterclockwise and conveys the material flow 9 comprising (or consisting of) threshed stalks onto a separator designed as a straw walker 15. The straw walker 15 separates grains 12 that are still in the material flow 9, short straw 16 and chaff 17 that also enter the cleaning apparatus 11 over a returns pan 18. Alternatively, the separator may be designed as at least one axial separation rotor. The grains 12 separated by the cleaning apparatus 11 are conveyed by a grain elevator 19 into the hopper 3 that is designed as a container with a substantially polygonal base and is typically arranged or positioned behind a driver's cab 22 of the harvester 1 (although other arrangements are contemplated). The hopper 3 has a top opening 21 that forms an opening plane. The extension elements 23*a*, 23*b*, 24*a*, 24*b* are arranged or positioned above the opening 21. As needed, the grains 12 are transferred by a grain tank discharge conveyor 20 from the hopper 3 to a transport truck (not shown). An arrow FR indicates the driving direction of the harvester 1 during harvesting. When the extension elements 23*a*, 23*b*, 24*a*, 24*b* are in transport position, they close the top opening 21 to maintain an overall height of the harvester 1 that is permissible in road traffic.

Figure 2:
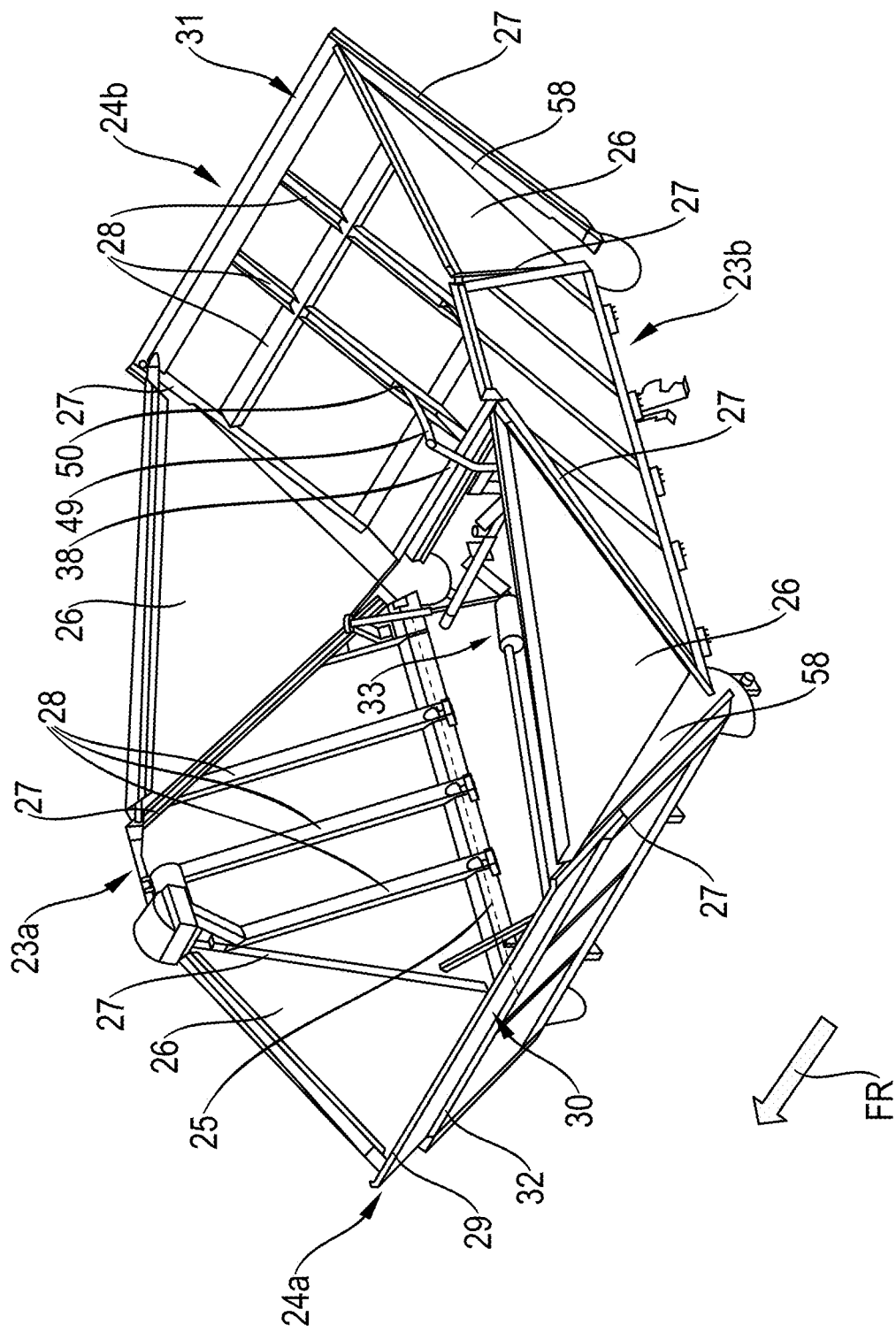
FIG. 2 illustrates a schematic representation of a perspective view of extension elements of the harvested material receptacle in their receiving position.

The depiction in FIG. 2 schematically shows a perspective view only of the extension elements 23*a*, 23*b*, 24*a*, 24*b* in their receiving position. As shown in FIG. 2, between every two adjacent extension elements 23*a*, 24*a*; 23*a*, 24*b*; 24*b*, 23*b*; 23*b*, 24*a*, an intermediate element 26 is arranged that is fastened to edge regions 27 of the adjacent extension elements 23*a*, 23*b*, 24*a*, 24*b* that extend in a vertical direction in the receiving position. The intermediate elements 26 comprise (or consist of) an elastic material. In particular, the intermediate elements 26 comprise (or consist of) a fabric-like material that has a high tearing resistance and on the other hand may be collapsed or folded due to its elasticity. The extension elements 23*a*, 23*b*, 24*a*, 24*b* comprise (or consist of) a material that is rigid per se. Moreover, to increase the rigidity, braces 28 may be provided that are arranged or positioned on the inner sides of the extension elements 23*a*, 23*b*, 24*a*, 24*b* which face each other. In one or some embodiments, the extension elements 23*a*, 23*b*, 24*a*, 24*b* may be formed in one piece.

According to one or some embodiments, the extension elements 23*a*, 23*b*, 24*a*, 24*b* that are opposite one another lie sandwich-like on each other when in their transport position. The extension elements 23*a*, 23*b* and 24*a*, 24*b* that oppose each other in pairs such that an upper extension element at least partly overlaps a lower extension element by at least a certain amount (such as overlap the lower extension element by at least 10% of a surface area of the lower extension element, overlap by at least 20%, overlap by at least 30%, overlap by at least 40%, overlap by at least 50%, overlap by at least 60%, overlap by at least 70%, overlap by at least 80%, overlap by at least 90%, overlap by at least 95%, overlap entirely by 100%) each other in their transport position. Alternatively, or in addition, extension elements in one or more pairs overlap one or more extension elements in another pair such that an upper extension element in one pair at least partly overlaps a lower extension element in another pair by at least a certain amount (such as overlap the lower extension element by at least 10% of a surface area of the lower extension element, overlap by at least 20%, overlap by at least 30%, overlap by at least 40%, overlap by at least 50%, overlap by at least 60%, overlap by at least 70%, overlap by at least 80%, overlap by at least 90%, overlap by at least 95%, overlap entirely by 100%). For example, a top pair formed by the extension elements 24*a*, 24*b* overlaps a bottom pair formed by the extension elements 23*a*, 23*b*, as explained in greater detail below. In their transport position, the extension elements 23*a*, 23*b*, 24*a*, 24*b* that lie sandwich-like on each other are positioned on each other in horizontal planes (e.g., at least two of the various elements lie flat in separate but parallel planes; alternatively, or in addition, at least one side of the various elements, such as a top side of 24*a* and 24*b*, via sections 30 and 31 mating, form a single plane). Viewed in the longitudinal direction of the harvested material receptacle 2, the extension elements 23*a*, 23*b* of the bottom pair are arranged or positioned on the opposing end faces of the hopper 3, whereas the extension elements 24*a*, 24*b* of the top pair are arranged or positioned on the opposing longitudinal sides of the hopper 3.

Figure 6A:
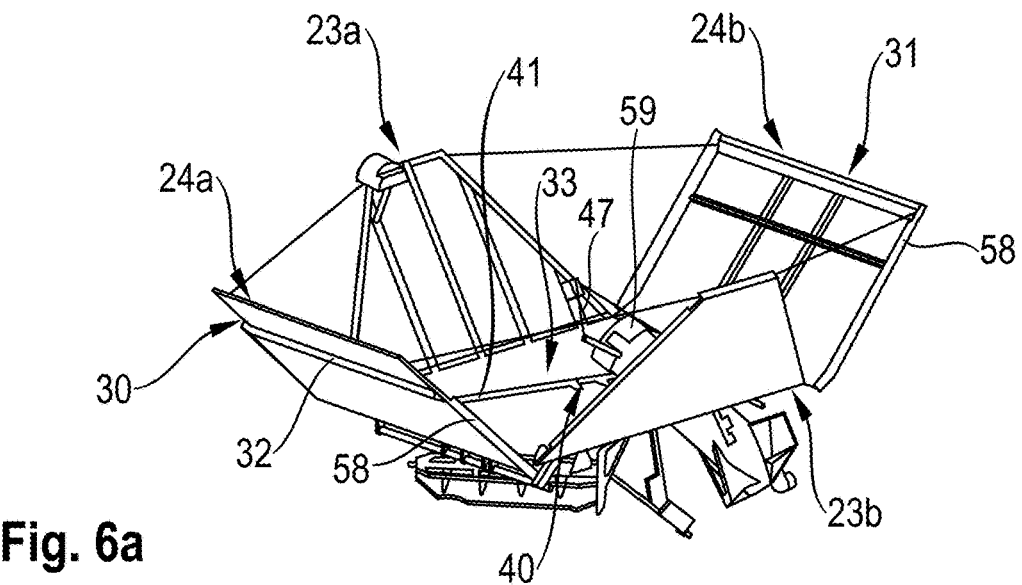
FIGS. 6a to 6f illustrates a schematic representation of a process of transferring the extension elements from the receiving position to the transport position.
Figure 6B:
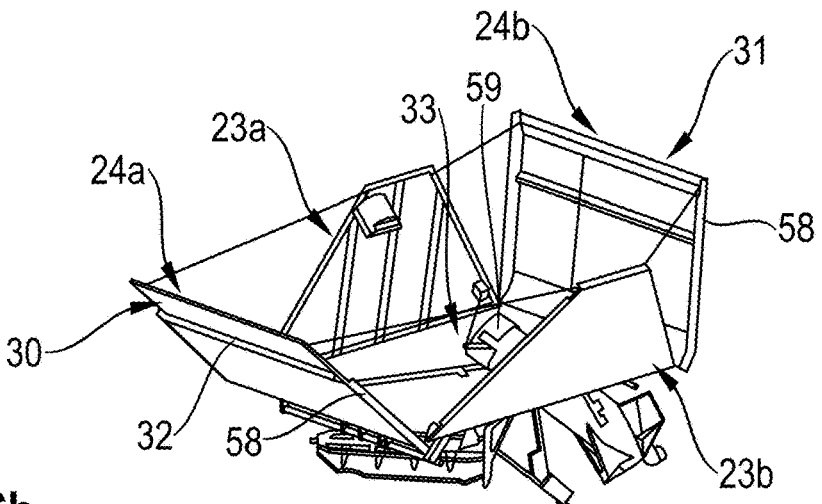
Figure 6C:
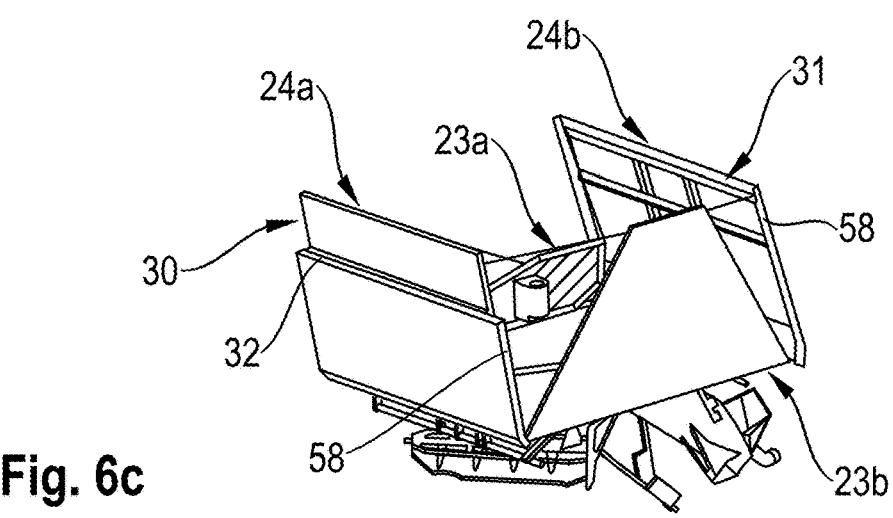
Figure 6D:
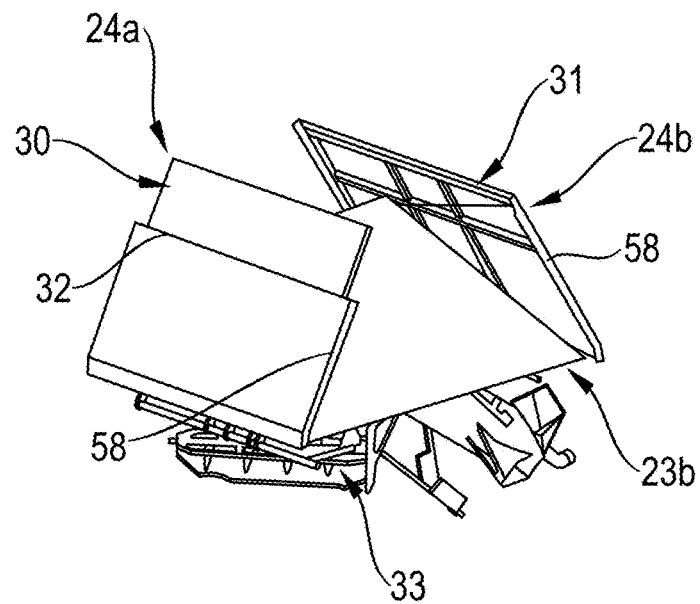
Figure 6E:
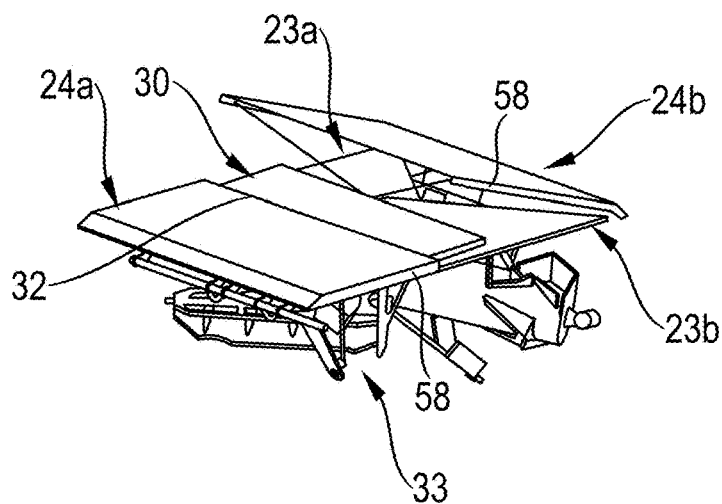
Figure 6F:
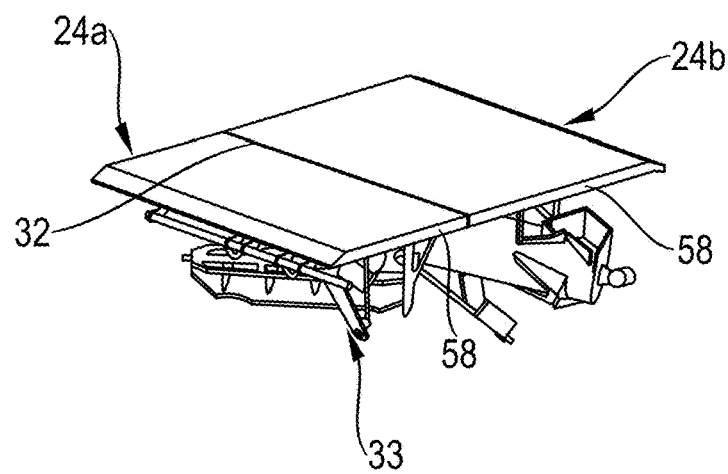

The top pair of extension elements 24*a*, 24*b* has complementary sections 30, 31 in its overlapping region that mesh with (or complement) each other in their transport position so that the top pair of extension elements 24*a*, 24*b* forms a substantially continuous plane when in the transport position as portrayed in FIG. 6*f*. In the portrayed embodiment, an extension element 24*a* has a step-shaped ledge 32 that runs parallel to the horizontal end-face outer edge 29 and borders the section 30 in the overlapping region with the opposing extension element 24*b*. The section of the opposing extension element 24*b* is identified with 31 and abuts the section 30 in a substantially form-fit in the closed transport position. In this way, when extension element 24*a* and extension element 24*b* are in the closed transport position, extension element 24*a* is at least partly covered by extension element 24*b* (e.g., section 31 of extension element 24*b* covers section 30 of extension element 24*a*) with section 30 mating with section 31 so that the top surface is substantially planar. The harvested material receptacle 2 includes an actuating device 33 to transfer the extension elements 23*a*, 23*b*, 24*a*, 24*b* between the transport position and receiving position.

In one or some embodiments, at the edge regions 27 extending in a vertical direction in the receiving position, the extension elements 24*a*, 24*b* of the top pair each or both may have a bevel 58 that extends toward the opposing extension element 24*a*, 24*b*. The bevels 58 run substantially perpendicular to the surface of the particular extension element 24*a*, 24*b*. The bevels 58 on the edge regions 27 of the extension elements 24*a*, 24*b* of the top pair may abut the extension elements 23*a*, 23*b* of the bottom pair in transport position. This may keep the extension elements 24*a*, 24*b* of the top pair at a distance from the extension elements 23*a*, 23*b* of the bottom pair located underneath so that they do not lie flush on each other. At the same time, this forms gaps that the intermediate elements 26 may at least partially fill when in the transport position.

Figure 3:
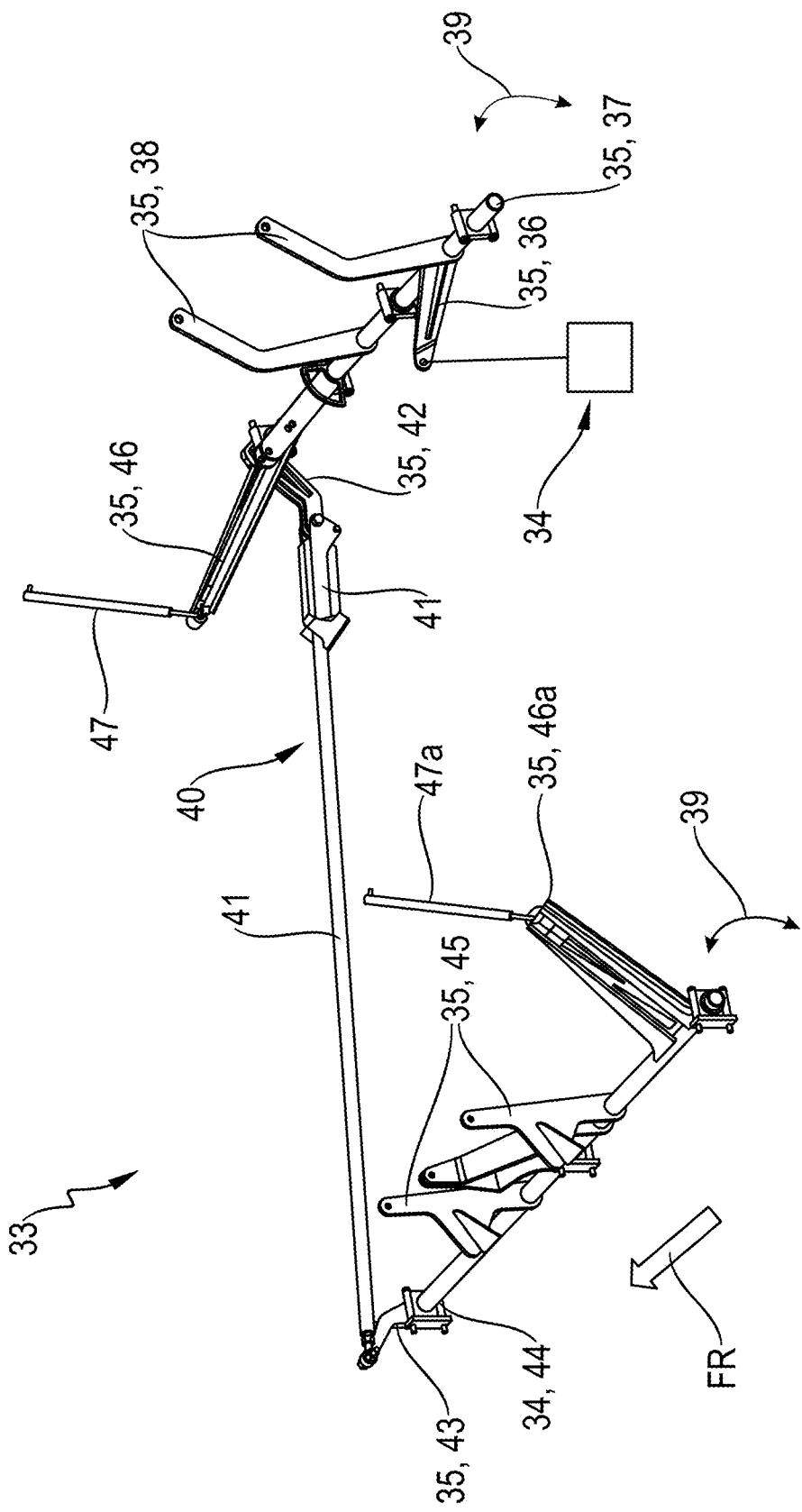
FIG. 3 illustrates a schematic representation of an actuating device for transferring the extension elements according to FIG. 2 between a transport position and the receiving position.

FIG. 3 schematically portrays the actuating device 33 for transferring the extension elements 23*a*, 23*b*, 24*a*, 24*b* according to FIG. 2 between the transport position and the receiving position. For reasons of simplification, the depiction only shows the essential components of the actuating device 33. In one or some embodiments, the actuating device 33 has a common actuator 34 that is configured for the controlled movement of the extension elements 23*a*, 23*b*, 24*a*, 24*b*. In this case, the extension elements 23*a*, 23*b*, 24*a*, 24*b* are drivingly connected to the actuator 34 by several mechanical coupling links 35. The extension elements 23*a*, 23*b*, 24*a*, 24*b* of the actuator 34 and the coupling links 35 form a kinematic chain. The term "coupling link" 35 is used for the sake of simplification as a general generic term for various mechanical components of the actuating device 33 that in part have different properties which will be specified in greater detail below.

In one or some embodiments, the actuator 34, which may be designed as a linear drive, contacts a coupling link 35 designed as a lever arm 36 which is connected so as to rotate with a rotatably mounted driveshaft 37 as another coupling link 35. Positioning levers 38 are arranged as coupling links 35 on the driveshaft 37 for concomitant rotation, on the free ends of which a lever 49 is pivotably arranged that is articulated to a bearing point 50 of the extension element 24b which is arranged or positioned on one of the longitudinal sides of the harvested material receptacle 2 running parallel to the driving direction FR. The linear movement generated by the actuator 34 is transmitted by the lever arm 36 to the driveshaft 37 and converted into a rotary movement 39. Another driveshaft 44 is arranged as a coupling link 35 parallel to the driveshaft 37. The driveshaft 44 is mechanically coupled to the opposing driveshaft 37 via a coupling link designed as a multipart linkage 40. The design of the multipart linkage 40 is explained in greater detail below with reference to FIG. 5.

The multipart linkage 40 comprises a coupling rod 41 that is arranged or positioned substantially transverse to the longitudinal axis of the harvested material receptacle 2, or respectively the driving direction FR. An end of the linkage 40 facing the driveshaft 37 is connected to a rocker arm 42 for conjoint rotation. The linkage 40 is articulated to the free end of the rocker arm 42. The free end of the coupling rod 41 is articulated to a coupling link 35 designed as a rocker arm 43. Positioning levers 45 may also be arranged or positioned as coupling links 35 on the driveshaft 44 for conjoint rotation, to which the corresponding extension element 24a is articulated through at least one lever 49 and at least one bearing point 50. The multi-part linkage 40 transmits a linear movement to the rocker arm 43, which is transmitted by the rocker arm 43 as a tilting or pivoting movement to the driveshaft 44.

In the region between the extension element 23a and the extension element 24b, a lever arm 46 is arranged or positioned as a coupling link 35 for conjoint rotation on the driveshaft 37. A characteristic-controlled coupling link 47 is arranged or positioned on the free end of the lever arm 46 and is connected to the extension element 23a. In one or some embodiments, the coupling link 47 is changeable in length, wherein the change of the length is controlled by a characteristic. The coupling link 47 may be designed as a gas spring, such as a gas tension spring. Depending on the direction of rotation, the rotational movement of the driveshaft 37 is transferred by the rocker arm 42 as a pulling or pushing movement to the coupling link 47, which results in a tilting or pivoting movement of the extending element 23a connected thereto. In the region between the extension element 23b and the extension element 24a, a lever arm 46a is arranged or positioned as a coupling link 35 for conjoint rotation on the driveshaft 37. A characteristic-controlled, length-adjustable coupling link 47a is also arranged or positioned on the free end of the lever arm 46a and is connected to the extension element 23b. The coupling link 47a may be designed as a gas spring, such as a gas tension spring.

Figure 4:
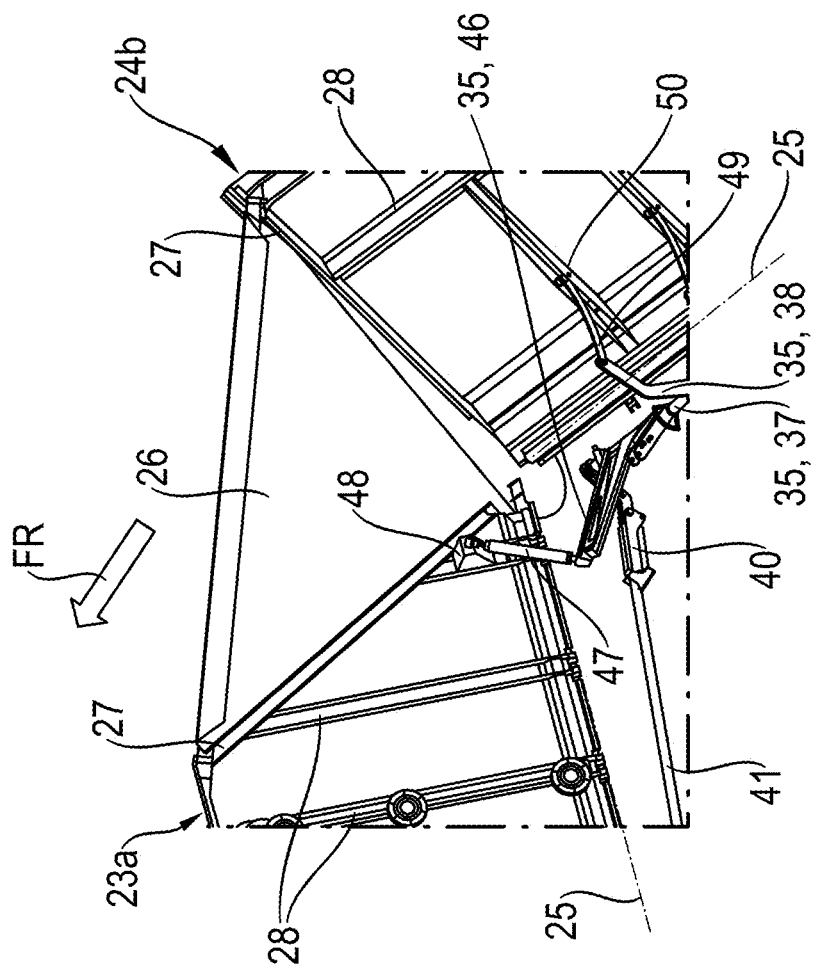
FIG. 4 illustrates a schematic representation of a partial view of the harvested material receptacle.

The depiction in FIG. 4 shows a partial view of the harvested material receptacle 2. A corner region of the harvested material receptacle 2 is depicted—viewed in the driving direction FR—in which the extension element 23a and the adjacent extension element 24b are connected to each other by the intermediate element 26. The coupling link 47 designed as a gas tension spring is articulated by its free end to a bearing point 48 arranged or positioned on the extension element 23a on the inside. The positioning levers 38, 45 are each articulated by a lever 49 to a bearing point 50 arranged or positioned on the interior on the extension element 24a and 24b. An "interior arrangement" may be understood as meaning that the bearing points 48, 50 in the transport position are facing the interior of the hopper 3.

Figure 5:
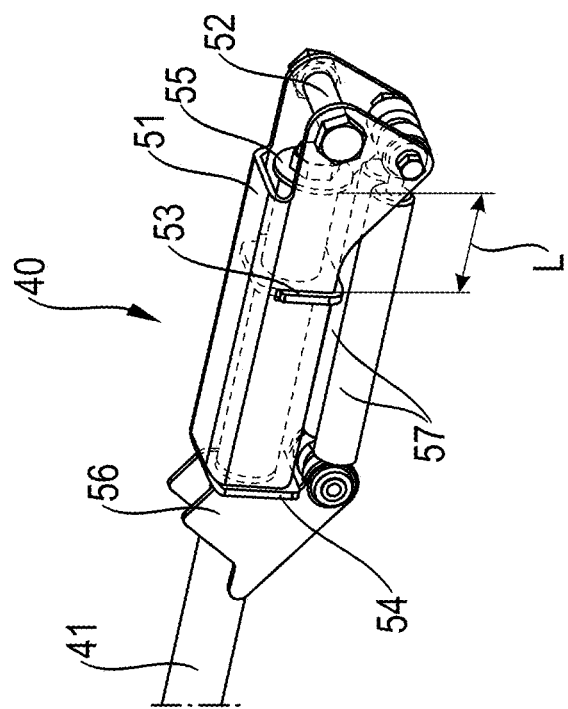
FIG. 5 illustrates a schematic representation of a partial view of a multipart linkage.

FIG. 5 portrays a partial view of the multipart linkage 40. The linkage 40 comprises the only partially shown coupling rod 41 and a coupling element 51. The coupling element 51 is designed as a substantially U-shaped profiled part. At its end facing the driveshaft 37, the coupling element 51 is pivotably articulated about a pivot shaft 52. The coupling element 51 has a first stop 53 and a second stop 54 that are fixedly arranged or positioned on the coupling element 51 coaxial to the coupling rod 41. The two stops of the coupling element 51 serve to guide the coupling rod 41. The coupling rod 41 and the coupling element 51 are movable relative to each other in the axial direction of the coupling rod 41. The first stop 53 is arranged adjacent to the pivot shaft 52. The second stop 54 is arranged at a distance from the first stop 53 of the coupling element 51.

The coupling rod 41 also has a first stop 55 and a second stop 56 that are fixedly arranged or positioned on the coupling rod 41. The first stop 55 is arranged or positioned on the free end of the coupling rod 41 and, viewed in the longitudinal direction of the coupling rod 41, is arranged or positioned behind the first stop 53 of the coupling element 51. The second stop 56, viewed in the longitudinal direction of the coupling rod 41, is arranged or positioned in front of the second stop 54 of the coupling element 51. At least one characteristic-controlled coupling link 57 is arranged or positioned parallel to the coupling rod 41 and the coupling element 51, and connects the coupling rod 41 and the coupling element 51 to each other. The at least one coupling link 57 may be designed as a damper. In one or some embodiments, at least two dampers are provided with same damping force as the coupling link 57.

The multipart design, which may comprise the two-part design of the components, the coupling rod 41 and coupling element 51, of the linkage 40 that move relative to each other permits a specific extension L of the coupling rod 41 relative to the coupling element 51 by the arrangement of the first and second stops 53, 54 of the coupling element 51 and the first and second stops 55, 56 of the coupling rod 41. When transferring from the receiving position to the transport position of the extension elements 24a, 24b, the second stop 56 of the coupling rod 41 lies against the second stop 54 of the coupling element 51, wherein the linkage 40 is not extended. The rotary movement 39 of the driveshaft 37 causes the coupling rod 41 to move due to the relative mobility of the first stop 53 of the coupling element 51 toward the first stop 55. This causes a delayed trailing movement of the extension element 24a relative to the extension element 24b. To transfer from the transport position to the receiving position of the extension elements 24a, 24b, the first stop 53 of the coupling element 51 is moved toward the first stop 55 of the coupling rod 41 due to the relative mobility. The extension L to be bridged thereby causes the extension element 24b to already be moved outward, whereas the extension element 24a underneath still remains in its transport position. Only when the first stop 53 of the coupling element 51 lies against the first stop 55 of the coupling rod 41 does the extension element 24a also start to move outward.

FIGS. 6a to 6f schematically show the process of transferring the extension elements 23a, 23b, 24a, 24b from the receiving position to the transport position. FIG. 6a shows the extension elements 23a, 23b, 24a, 24b in their receiving position as the home position. The intermediate elements 26 connecting the extension elements 23a, 23b, 24a, 24b in a circumferential direction are not depicted for the sake of clarity. In one or some embodiments, the coupling link 47 designed as a gas tension spring does not change in length when the extension element 23a is in the home position. The extension element 23a, via the coupling link 47 arranged or positioned on the driveshaft 37, and the extension element 24b, via the positioning lever 38 arranged or positioned on the driveshaft 37, is initially made to swing toward the transport position by controlling the actuator 34. The linkage 40 that transmits the rotary movement 39 exerted by the actuator 34 on the driveshaft 37 via the rocker arm 43 to the opposite driveshaft 44 may also be in a substantially unextended position when in the home position so that the extension elements 23b and 24b are not moved (e.g., they first remain in their home position). The closing process of the two extension elements 23b and 24b therefore may start at a delay in comparison to the extension elements 23a and 24a.

In FIG. 6b, it can be seen that, after controlling the actuator 34, such as by a control device of the harvester 1, the extension element 23a has an inwardly directed inclination relative to the vertical axis of the harvested material receptacle 2. In particular, the harvester 1 may include a user interface and a control device in order to control the actuator 34. User interface may comprise a display, a button, or the like in order to enter a command to control actuator (e.g., to transition from the receiving position to the transport position and/or vice versa). Responsive to the input received via the user interface, the control device may transmit a command to the actuator 34. The command may be indicative to the actuator 34 to transition from the receiving position to the transport position or vice versa. In one or some embodiments, the control device may comprise at least one processor and at least one memory. In particular, control device may include one or more processors and the one or more memories. The processor may comprise a microprocessor, controller, PLA or the like and may be part of a single machine, which includes a microprocessor (or other type of controller) and a memory unit. The microprocessor and memory unit are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The extension element 23a is inclined toward the opposite extension element 23b, wherein the extension element 23b also has an outwardly directed inclination (e.g., the extension element 23a has moved more than extension element 23b, with extension element 23b substantially unmoved). The inclination of the extension element 23a is large enough in this intermediate position for the center of gravity of the extension element 23a to be exceeded (e.g., the extension element 23a would tilt inward without a counterforce). In one or some embodiments, the greater inclination of the extension element 23a in comparison to the opposite extension element 23b (e.g., the greater movement of the extension element 23a relative to the extension element 23b) is caused by the coupling link 47. In this case, the coupling link 47 designed as a gas tension spring has a specific characteristic and a definite trip load (e.g., a specific counterforce that the coupling link 47 needs before it triggers an extension). Moreover, the characteristic curve may be chosen such that a lesser load than the trip load is simultaneously needed to fully extend the coupling link 47 designed as a gas tension spring. Until the trip load is reached, the traction transmitted by the lever arm 46 is likewise transmitted by the unextended coupling link 47 to the extension element 23a.

The extension element 24b next to the extension element 23a also has an inclination directed toward the opposite extension element 24a due to the rotary movement 39 transmitted by the actuator 34 to the driveshaft 37, wherein the center of gravity of the extension element 24b is not exceeded. Thus, as shown in FIG. 6b, the extension element 24b has moved whereas extension element 24a has not moved (or moved less than extension element 24b). Further, the extension element 24b is moved to a position less than the point where the center of gravity of the extension element 24b would be exceeded.

FIG. 6c shows all extension elements 23a, 23b, 24a, 24b in a position that is significantly changed from FIG. 6a. The extension element 23a is inclined further inward since the coupling link 47 has not yet undergone a change in length. The extension element 24b next to the extension element 23a has an inclination that already goes beyond the center of gravity of the extension element 24b. The extension elements 23b and 24a are also now located in an inwardly angled position (e.g., the extension elements 23b and 24a have moved), wherein the center of gravity of the extension elements 23b and 24a is not exceeded. To prevent an undampened inward tilting of the extension elements 23a and 24b without a counterforce, especially since the linkage 40 is moving from its unextended state toward its extended state due to the continued rotation of the driveshaft 37, this tilting movement is dampened by the characteristic-controlled coupling link 57. The retraction of the linkage 40 up to the unextended state enables an at least brief accelerated tilting movement of the extension elements 24a and 23b relative to the tilting movement of the extension elements 24b and 23a. In this regard, at this point in the process, the extension elements 24a and 23b have a greater acceleration of tilting movement than the tilting movement of the extension elements 24b and 23a.

From FIG. 6d, it can be seen that all extension elements 23a, 23b, 24a, 24b have an inclination that goes beyond the center of gravity. The extension element 23a is located in a position below the extension element 23b in which it lies on a support 59 such as a filling head in the interior of the harvested material receptacle 2 (e.g., extension element 23a is in the transport position). The extension element 23b is held by the intermediate elements 26 (not shown) of the extension elements 24a and 24b in an inclined position that lies below the extension elements 24a, 24b (e.g., extension element 23b is closer to transport position). In one or some embodiments, at this stage, the movement of the extension elements 24a and 24b may be delayed or may be less than the movement of one or both of extension elements 23a or 23b. This may be achieved on the one hand by the extension L as described above, and on the other hand by the at least one coupling link 57 designed as a damper that cause the greatest possible damping with a fixedly defined duration when the center of gravity of the extension elements 24a and 23b is specifically exceeded.

After the horizontal end position of the extension element 23a is reached, the coupling link 47 is extended that beforehand remained in an unextended state so that the driveshaft 37 may still rotate in order to transfer the extension elements 23b, 24a, 24b which are not yet in their transport position into the transport position. The same holds true for the coupling link 47a designed as a gas tension spring that is responsible for closing the extension element 23b and is arranged or positioned on the driveshaft 44 using the lever arm 46a.

The depiction according to FIG. 6e shows the extension elements 23a, 23b, 24a in their transport position, whereas the extension element 24b is still at a distance from the extension element 24a located underneath. The extension elements 23a, 23b which are termed the bottom pair have an inclination relative to the horizontal in their transport position in comparison to the top pair of extension elements 24a, 24b. Thus, while extension element 24b at an earlier stage moved more (see FIGS. 6a-b), extension element 24a thereafter moved further so that extension element 24a was moved to the transport position before extension element 24b.

FIG. 6f shows the extension elements 23a, 23b, 24a, 24b in their transport position. The extension elements 24a, 24b that are termed the top pair form a substantially continuous flat plane. The extension elements 23a, 23b which are termed the bottom pair have an inclination relative to the horizontal in their transport position in comparison to the top pair, which in particular may be seen in FIG. 6e. In the transport position, the extension elements 23a, 23b and 23a, 24b that each oppose each other lie sandwich-like on each other. The extension elements 23a, 23b and 24a, 24b that oppose each other overlap each other in their transport position. In so doing, the top pair, the extension elements 24a, 24b, overlap the bottom pair, the extension elements 23a, 23b. In their transport position, the extension elements 23a, 23b, 24a, 24b that lie sandwich-like on each other are positioned on each other in horizontal planes.

The extension elements 23a, 23b, 24a, 24b are accordingly transferred from their transport position shown in FIG. 6f into the receiving position shown in FIG. 6a in reverse. Conversely when moving from the transport position into the receiving position, first only the uppermost extension element 24b that is mechanically connected directly to the driveshaft 37 is moved. Once the linkage 40 has reached its unextended state, the extension element 24a opens. Then the lever arm 46a assigned to the extension element 23b reaches its unextended state due to the rotary movement 39 of the driveshaft 44 which then causes the extension elements 23b to open. This is ultimately followed by the swinging of the bottom extension element 23a into the receiving position once the coupling link 47 has reached its unextended state.

The actuation device 33, together with the extension elements 23a, 23b, 24a, 24b, form a kinematic chain. Using the characteristic-controlled coupling links 47 and 57, despite the mechanical coupling of the components of the actuation device 33 and the extension elements 23a, 23b, 24a, 24b, a fixed time sequence may be specified in that a temporary decoupling is effectuated by the coupling links 47 and 57 which enables a collision-free sequential folding and unfolding of the extension elements 23a, 23b, 24a, 24b. All of the extension elements 23a, 23b, 24a, 24b may be controlled and moved by the just one actuator 34 of the actuating device 33. In this way, Thus, FIGS. 6a-f illustrate that because the extension elements 23a, 23b, 24a, 24b overlap one another, there may be structure and/or software that controls the movement of one or more of the extension elements 23a, 23b, 24a, 24b so that the extension elements 23a, 23b, 24a, 24b may be folded into the transport position in a predetermined sequence (e.g., moving one, some or each of the extension elements 23a, 23b, 24a, 24b into the transport position sequentially and in a predetermined order) and/or unfolded into the receiving position in a predetermined sequence (e.g., moving one, some or each of the extension elements 23a, 23b, 24a, 24b into the receiving position sequentially and in a predetermined order). For example, when folding, the sequence of the respective extension element in its final folded position (e.g., the final transport position) is as follows: 23a; 23b; 24a; 24b. The sequence may likewise be reversed in unfolding, as discussed above. Further, respective pairs of extension elements may be moved into the final transport position one after the other (e.g., extension elements 23a and 23b are first folded into the final transport position and then extension elements 24a and 24b are folded into the final transport position). In this way, the extension elements (23a, 23b; 24a, 24b) that are opposite may each other overlap each other in their transport position, and the top pair of extension elements (24a, 24b) may overlap the bottom pair of extension elements (23a, 23b). In addition, Further, as discussed above, in one or some embodiments, at least two of the extension elements 23a, 23b, 24a, 24b may at least partly overlap in the transport position. In one embodiment, extension elements in the same pair (such as 23a and 23b, or 24a and 24b) may at least partly overlap one another. Alternatively, or in addition, extension elements from different pairs (such as 23a and 24a and/or 24b; or 23b and 24a and/or 24b) may at least partly overlap one another. Thus, in one embodiment, each extension element may at least partly overlap with its opposing extension element (e.g., one or both of 23a and 23b or 24a and 24b) and extension elements from different pairs may overlap as well (e.g., one or both of 23a and 23b may at least partly overlap with one or both of 24a and 24b). In this way, at least some, or all, of the extension elements may at least partly overlap in order to lie sandwich-like on each other.

It is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

| List of Reference Numbers | |
|---|---|
| 1 | Harvester |
| 2 | Harvested material receptacle |
| 3 | Hopper |
| 4 | Attachment |

| List of Reference Numbers | |
|---|---|
| 5 | Inclined conveyor |
| 6 | Harvested material |
| 7 | Threshing system |
| 8 | Grains/chaff mixture |
| 9 | Flow of material |
| 10 | Grain pan |
| 11 | Cleaning device |
| 12 | Grains |
| 13 | Non-grain components |
| 14 | Turning drum |
| 15 | Straw walker |
| 16 | Short straw |
| 17 | Chaff |
| 18 | Returns pan |
| 19 | Grain elevator |
| 20 | Grain tank discharge conveyor |
| 21 | Opening of 3 |
| 22 | Driver's cab |
| 23a | Extension element |
| 23b | Extension element |
| 24a | Extension element |
| 24b | Extension element |
| 25 | Pivot axis |
| 26 | Intermediate element |
| 27 | Edge region |
| 28 | Brace |
| 29 | Outer edge |
| 30 | Section of 24a |
| 31 | Section of 24b |
| 32 | Ledge |
| 33 | Actuating device |
| 34 | Actuator |
| 35 | Coupling link |
| 36 | Lever arm |
| 37 | Driveshaft |
| 38 | Positioning lever |
| 39 | Rotary movement |
| 40 | Linkage |
| 41 | Coupling rod |
| 42 | Tilt lever |
| 43 | Tilt lever |
| 44 | Driveshaft |
| 45 | Positioning lever |
| 46, 46a | Lever arm |
| 47, 47a | Coupling link |
| 48 | Bearing point |
| 49 | Lever |
| 50 | Bearing point |
| 51 | Coupling element |
| 52 | Pivot axis |
| 53 | First stop |
| 54 | Second stop |
| 55 | First stop |
| 56 | Second stop |
| 57 | Coupling link |
| 58 | Bevel |
| 59 | Support |
| L | Extension |
| FR | Driving direction |

What is claimed is:

1. A harvested material receptacle for a harvester comprising:

a hopper that is open at a top with a substantially polygonal opening cross-section and extension elements arranged in pairs opposite each other and are each pivotably articulated about a substantially horizontally running pivot shaft at an edge of an opening of the hopper to transition the extension elements from a substantially or entirely closed transport position into an open receiving position and from the receiving position to the transport position, an actuating device configured to transition the extension elements between the transport position and the receiving position;

wherein the extension elements that are opposite one another at least partially overlap when in the transport position;

wherein the extension elements comprise a top pair of extension elements and a bottom pair of extension elements;

wherein in the closed transport position, both of:
one of the top pair of extension elements at least partially overlaps another of the top pair of extension elements; and
one of the bottom pair of extension elements at least partially overlaps another of the bottom pair of extension elements;

wherein the actuating device comprises a common actuator configured to control movement of both the top pair of extension elements and the bottom pair of extension elements by a plurality of mechanical coupling links;

wherein the plurality of mechanical coupling links comprises a first coupling link and a second coupling link designed as a damper;

wherein the actuating device is configured to move the bottom pair of the extension elements and the top pair of the extension elements to a final position at the transport position in a predetermined sequence;

wherein the damper is configured to dampen a tilting movement of the one of the top pair of extension elements and the one of the bottom pair of extension elements; and wherein, while dampening the tilting movement of the one of the top pair of extension elements and the one of the bottom pair of extension elements, retraction of a linkage is configured to provide greater acceleration of tilting movement of the another of the top pair of extension elements and the another of the bottom pair of extension elements than the tilting movement of the one of the top pair of extension elements and the one of the bottom pair of extension elements.

2. The harvested material receptacle of claim 1, wherein the bottom pair of extension elements lie sandwich-like on each other and are positioned on each other in horizontal planes; and
wherein in the transport position, the top pair of extension elements and the bottom pair of extension elements are positioned on each other in horizontal planes such that each of the top pair of extension elements and each of the bottom pair of extension elements at least partly overlap over one another.

3. The harvested material receptacle of claim 1, wherein the top pair of extension elements and the bottom pair of extension elements are designed as a single piece.

4. The harvested material receptacle of claim 1, wherein the top pair of extension elements have complementary sections in an overlapping region that mate in the transport position so that the top pair of extension elements form a substantially continuous flat plane;
wherein, in the transport position, both the top pair of extension elements and the bottom pair of extension elements lie sandwich-like on each other in flat and parallel planes; and
wherein, in the transport position, at least a portion of the overlapping region of the top pair of extension elements overlaps at least a portion of the overlapping region of the bottom pair of extension elements.

5. The harvested material receptacle of claim 1, wherein, in transitioning to the transport position, the bottom pair of extension elements have an inclination relative to an opening plane of the hopper in comparison to the top pair of extension elements.

6. The harvested material receptacle of claim 1, wherein an intermediate element is positioned between at least two adjacent extension elements.

7. The harvested material receptacle of claim 6, wherein the intermediate element comprises an elastic material.

8. The harvested material receptacle of claim 1, wherein an intermediate element is positioned between at least one of the top pair of extension elements or the bottom pair of extension elements;
  wherein at edge regions extending in a vertical direction in the receiving position, the top pair of extension elements have a bevel that extends toward an opposing extension element; and
  wherein, in the closed transport position, the bevel results in a gap between the top pair of extension elements from the bottom pair of extension elements so that the intermediate element at least partially fills the gap.

9. The harvested material receptacle of claim 1,
  wherein the actuating device is configured to move the bottom pair of the extension elements and the top pair of the extension elements to the final position at the transport position in the predetermined sequence one extension element at a time.

10. The harvested material receptacle of claim 1, wherein at least one of the bottom pair of extension elements is drivingly connected to the actuator by at least one characteristic-controlled coupling link such that a sequential movement of both of the bottom pair of extension elements is performed;
  wherein the coupling link is configured to change in length based on a characteristic; and
  wherein the at least one coupling link is configured not to change in length when at least one of the bottom pair of extension elements is in the receiving position.

11. The harvested material receptacle of claim 10, wherein the at least one characteristic-controlled coupling link comprises a spring.

12. The harvested material receptacle of claim 11, wherein the spring comprises a gas tension spring.

13. The harvested material receptacle of claim 1, wherein the top pair of extension elements are connected to each other by a coupling link designed as a multipart linkage through which a sequential movement of both of the top pair of extension elements is performed;
  wherein, at an earlier stage in transitioning from the receiving position to the transport position, the one of the top pair of extension elements is configured to move more than the another of the top pair of extension elements; and
  wherein, later in transitioning from the receiving position to the transport position, the another of the top pair of extension elements is configured to move to the transport position before the one of the top pair of extension elements.

14. A harvested material receptacle for a harvester comprising:
  a hopper that is open at a top with a substantially polygonal opening cross-section and extension elements arranged in pairs opposite each other and are each pivotably articulated about a substantially horizontally running pivot shaft at an edge of an opening of the hopper to transition the extension elements from a substantially or entirely closed transport position into an open receiving position and from the receiving position to the transport position,
  wherein the extension elements that are opposite one another at least partially overlap when in the transport position;
  wherein the extension elements comprise a top pair of extension elements and a bottom pair of extension elements;
  wherein in the closed transport position, both of:
    one of the top pair of extension elements at least partially overlaps another of the top pair of extension elements; and
    one of the bottom pair of extension elements at least partially overlaps another of the bottom pair of extension elements;
  wherein the top pair of extension elements are connected to each other by a coupling link designed as a multipart linkage through which a sequential movement of both of the top pair of extension elements is performed;
  wherein, at an earlier stage in transitioning from the receiving position to the transport position, the one of the top pair of extension elements is configured to move more than the another of the top pair of extension elements;
  wherein, later in transitioning from the receiving position to the transport position, the another of the top pair of extension elements is configured to move to the transport position before the one of the top pair of extension elements;
  wherein the multipart linkage includes a coupling rod and a coupling element that are movable relative to each other in a longitudinal direction of the coupling rod;
  wherein the coupling rod and the coupling element are connected to each other by at least one characteristic-controlled coupling link;
  wherein the coupling link is positioned on a driveshaft; and
  wherein the linkage is configured to transmit a rotary movement exerted by an actuator on the driveshaft to an opposite driveshaft and is in a substantially unextended position when in the receiving position so that one of the top pair of extension elements and one of the bottom pair of extension elements remain in the receiving position so that, in transitioning from the receiving position to the transport position, the one of the top pair of extension elements and one of the bottom pair of extension elements are delayed in transitioning from the receiving position to the transport position than the other of the top pair of extension elements and the other of the bottom pair of extension elements.

15. A self-propelled harvester comprising:
  a conveyor configured to receive harvested material;
  a threshing system configured to receive the harvested material from the conveyor and to process the harvested material; and
  a hopper configured to receive at least a part of the harvested material, the hopper being open at a top with a substantially polygonal opening cross-section and extension elements arranged in pairs opposite each other and each being pivotably articulated about a substantially horizontally running pivot shaft at an edge of an opening of the hopper to transition the extension elements from a substantially or entirely closed transport position into an open receiving position and from the receiving position to the transport position, an actuating device configured to transition the extension elements between the transport position and the receiving position;

wherein the extension elements that are opposite one another at least partially overlap when in the transport position;

wherein the extension elements comprise a top pair of extension elements and a bottom pair of extension elements;

wherein in the closed transport position, both of:
- one of the top pair of extension elements at least partially overlaps another of the top pair of extension elements; and
- one of the bottom pair of extension elements at least partially overlaps another of the bottom pair of extension elements;

wherein the actuating device comprises a common actuator configured to control movement of both the top pair of extension elements and the bottom pair of extension elements by a plurality of mechanical coupling links;

wherein the plurality of mechanical coupling links comprises a first coupling link and a second coupling link designed as a damper;

wherein the actuating device is configured to move the bottom pair of the extension elements and the top pair of the extension elements to a final position at the transport position in a predetermined sequence;

wherein the damper is configured to dampen a tilting movement of the one of the top pair of extension elements and the one of the bottom pair of extension elements; and wherein, while dampening the tilting movement of the one of the top pair of extension elements and the one of the bottom pair of extension elements, retraction of a linkage is configured to provide greater acceleration of tilting movement of the another of the top pair of extension elements and the another of the bottom pair of extension elements than the tilting movement of the one of the top pair of extension elements and the one of the bottom pair of extension elements.

16. The harvested material receptacle of claim 1, wherein, in the transport position, at least a portion of an overlapping region of the top pair of extension elements overlaps at least a portion of an overlapping region of the bottom pair of extension elements.

17. The harvested material receptacle of claim 16, wherein, in the transport position, the at least a portion of the overlapping region of the top pair of extension elements overlaps the at least a portion of the overlapping region of the bottom pair of extension elements by at least 20%.

18. The harvested material receptacle of claim 16, wherein, in the transport position, the at least a portion of the overlapping region of the top pair of extension elements overlaps the at least a portion of the overlapping region of the bottom pair of extension elements by at least 50%.

19. The self-propelled harvester of claim 15, wherein, in the transport position, at least a portion of an overlapping region of the top pair of extension elements overlaps at least a portion of an overlapping region of the bottom pair of extension elements.

* * * * *